Dec. 12, 1950     P. C. JURS     2,533,264
VALVE CONSTRUCTION FOR GAUGING TAPES
Filed Oct. 11, 1946
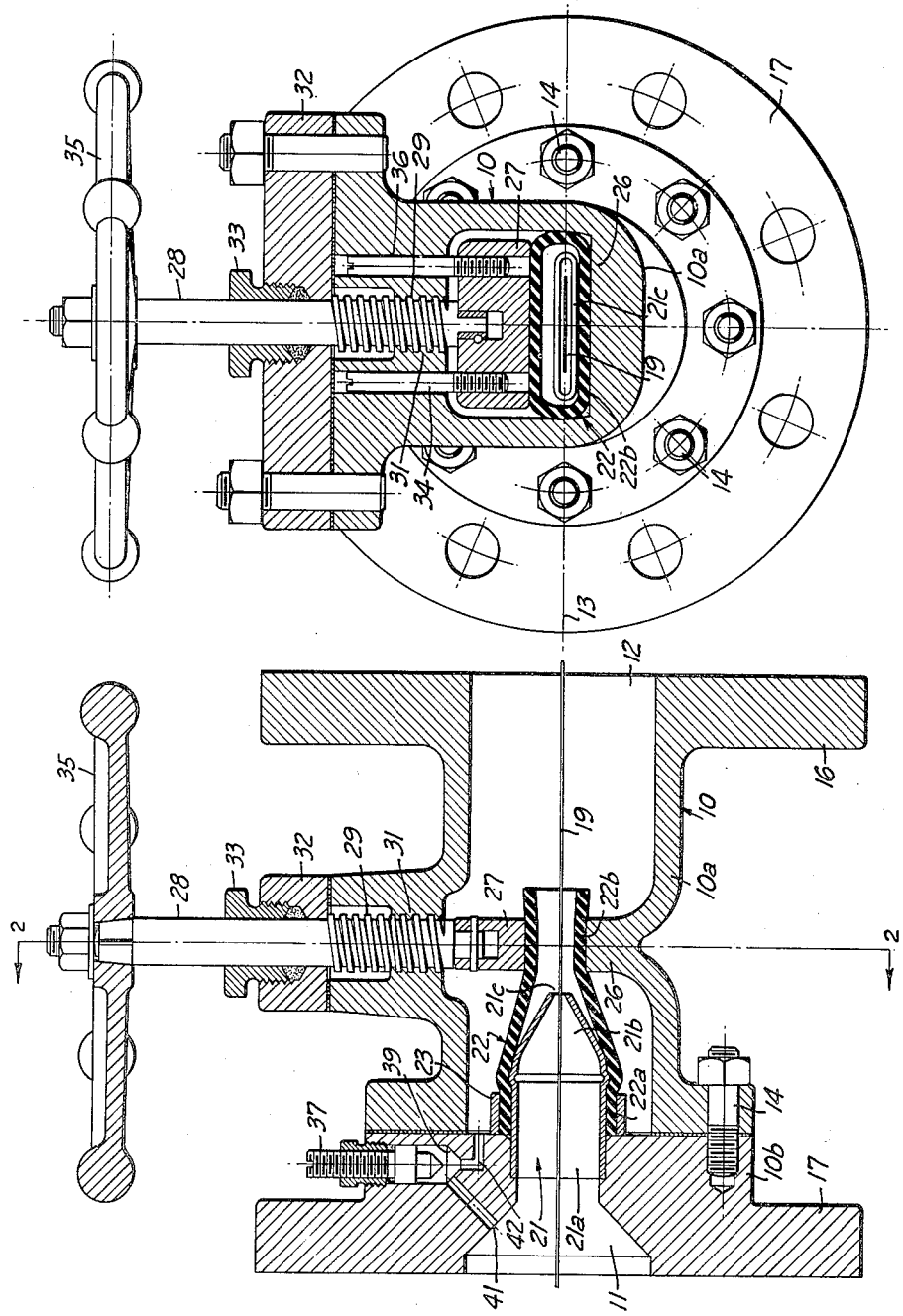
INVENTOR
Peter C. Jurs
BY
Paul D. Flehr
ATTORNEY Patented Dec. 12, 1950

2,533,264

UNITED STATES PATENT OFFICE 2,533,264

VALVE CONSTRUCTION FOR GAUGING TAPES

Peter C. Jurs, Oakland, Calif., assignor to Shand and Jurs Company, Berkeley, Calif., a partnership Application October 11, 1946, Serial No. 702,804

3 Claims. (Cl. 73—319)

1

This invention relates generally to valves of the type adapted for use in conjunction with tank gauging equipment.

In many types of tank gauging and sampling equipment it is common practice to use a metal tape which is lowered into the tank and which is carried upon a reel to enable raising or lowering of the same. Where it is desired to maintain the tank sealed with respect to the surrounding atmosphere the reel is located within a closed housing which in turn is connected with the interior of the tank through a pipe or closed passage. Examples of such equipment are shown in Jurs No. 2,114,113 and No. 2,295,218, and Larson No. 2,265,376. In many instances it is desirable to provide with such equipment a valve whereby one may close the passage connecting the housing with the interior of the tank. The construction of such a valve presents a particular problem in that when open it must not interfere with free movements of the tape during gauging operations, it must make possible vapor tight closure without damage to the tape, its sealing surfaces must not be susceptible of ready injury, and it must operate satisfactorily when subjected to various vapors, such as hydrocarbons, encountered in the petroleum industry.

It is an object of the present invention to provide a novel and satisfactory valve particularly adapted for the service outlined above.

A further object of the invention is to provide a valve of the above character which is capable of fluid tight shut off upon a metal gauging tape, without in any way interfering with the desired free movements of the tape during gauging operations.

Additional objects of the invention will appear from the following description in which the preferred embodiment has been set forth in detail in conjunction with the accompanyig drawing.

Referring to the drawing:

Figure 1 is a side elevational view in section showing a valve incorporating the present invention.

Figure 2 is a cross-sectional view taken along the line 2—2 of Figure 1.

The valve as illustrated in the drawing consists of a body 10 formed to provide the inflow and outflow passages 11 and 12. These passages are shown aligned on the central axis 13. For convenience the body is formed of two separable parts 10a and 10b which are normally clamped together by the studs and nuts 14.

Flange 16 on the main body 10a is representa-

2 tive of suitable means for attaching the valve body to piping which in turn connects with the exterior housing of the gauging means. As previously described this housing in a typical instance encloses a reel upon which the metal tape is wound. The body part 10b is likewise shown provided with a flange 17 by means of which the body can be secured to the roof of a tank, or to a conduit which in turn is coupled to the tank. The metal gauging tape 19 is normally adapted to extend axially of the valve body, and may in a typical instance have its lower end connected with a suitable float.

Mounted upon the body part 10b there is a metal guide nozzle 21, which in turn is surrounded by the resilient rubber tube 22. The guide nozzle is formed with a substantially cylindrical portion 21a attached to the body part 10b, and a tapered portion 21b which provides a relatively narrow slot like end opening 21c. This opening is aligned with and arranged symmetrically with respect to the axis of the valve body.

The resilient tube 22 can be formed cylindrical although when assembled with the other parts of the valve it assumes a modified shaping as will be presently described. One end portion 22a of this resilient tube is fitted symmetrically about the portion 21a of guide tube 21, and is retained upon the guide tube by suitable means such as the annular metal clamp 23.

The portion 22b of the resilient tube extends beyond the portion 21b of the guide tube, and is associated with means enabling pinching or collapsing of the same to closed position. The body is formed to provide the relatively flat abutment 26 which serves to engage one side of the resilient tube. The other side of the resilient tube is engaged by the presser block 27 which is loosely attached to the inner end of the operating stem 28. The stem is provided with a threaded portion 29 which engages an internally threaded portion 31 of the body. The stem also extends through a bonnet plate 32 which is clamped to the body and which carries the gland 33 for sealing about the stem. A pair of spaced parallel rods 34 are attached to the presser block and slidably extend within the openings 36 formed in the body. Thus the presser block is prevented from rotating when the stem is rotated, and it is guided for movements toward and away from the abutment 26.

Normally that portion of the resilient tube between the presser block and abutment 26 is partially collapsed as shown in Figure 1. The slot 21c in the end of the guide nozzle has a length somewhat less than the collapsed inner width of the resilient tube, as shown in Figure 2. Likewise all portions of the resilient tube are spaced outwardly from the area of slot 21c whereby the metal tape in its operation through this slot cannot contact the inner surfaces of the resilient tube. It will be evident that upon turning of the hand wheel 35 the stem together with the presser block 27 is moved inwardly toward the shoulder 26, and as a result the resilient tube is completely collapsed between the block 27 and abutment 26.

In addition to the structure described above it is desirable to provide a small by-pass valve. Thus a small threaded needle valve 37 is mounted in the body part 10b, and is adapted to normally engage the stationary valve seat 39. Upon opening this needle valve vapor or gas may flow through the ducts 41 and 42.

Operation of the valve described above can be reviewed as follows: Assuming installation of the valve upon the top of a tank in conjunction with piping leading to an exterior housing, as previously described, while the valve remains open the tape 19 extends through the resilient tube and the guide nozzle 21 and may operate freely with a minimum of friction. When it is desired to close off the passage between the tank and the housing of the gauging apparatus, handwheel 35 is turned to completely collapse the resilient tube upon the tape. Since the tape is made of relatively thin material it readily imbeds itself in the walls of the resilient tube, and does not interfere with establishment of a fluid tight seal. The metal tape is not in any way damaged when the valve is closed, particularly because it is not bent in such a manner as might occasion permanent deformation. The resilient tube can be formed of suitable synthetic rubber which is capable of withstanding the vapors or gases to which it is subjected.

Before opening the valve after a period of closure, it may be desirable to first equalize the pressures on the inlet and outlet sides of the valve. This can be done by opening the small needle valve 38 which permits flow of vapor or gas to an extent sufficient to equalize the pressures, whereby thereafter the valve can be opened without the danger of causing the valve to remain closed by virtue of a pressure differential.

I claim:

1. In a valve of the type adapted to close upon a tape, a valve body having inflow and outflow passages, members disposed within the body adapted to be moved toward or away from each other, a resilient sleeve disposed within the body and having one end of the same communicating with one of said passages, the other end portion of said sleeve being disposed between said members, and metal tape guiding means disposed within said sleeve and extending to a point in proximity with said other end portion.

2. In a valve adapted to close upon a gauging tape, a valve body having inflow and outflow passages through which the tape is adapted to extend, relatively movable members disposed within the body and movable toward or away from each other, a resilient sleeve disposed within the body and having one end of the same communicating with one of said passages, the other end of said sleeve extending between said members, and tape guiding means disposed within said sleeve and formed to retain a metal tape extending through the same out of contact with said resilient sleeve for open position of the same, said sleeve being adapted to collapse to closed position upon said tape.

3. In a valve of the character described, a valve body having inflow and outflow passages, a resilient sleeve disposed within the body and having one end of the same communicating with one of said passages, means for collapsing the other end portion of said sleeve to thereby interrupt communication between said passages, and a tubular metal tape guiding member disposed within said resilient sleeve, said last named member having a tapered end portion providing a slot like opening through which the tape may pass said opening being disposed to retain a tape out of contact with said sleeve for open position of the latter and being disposed adjacent said other end portion of the sleeve.

PETER C. JURS.

REFERENCES CITED

The following references are of record in the file of this patent:

UNITED STATES PATENTS

| Number | Name | Date |
|---|---|---|
| 2,217,959 | Long | Oct. 15, 1940 |
| 2,387,660 | Hall | Oct. 23, 1945 |